C. STANG.
PHOTOMETER.
APPLICATION FILED SEPT. 28, 1918.
1,329,439. Patented Feb. 3, 1920.
2 SHEETS—SHEET 1.
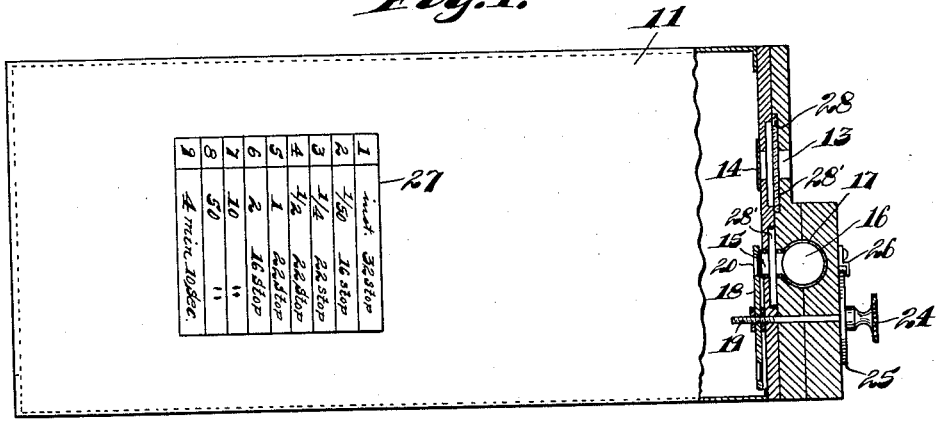
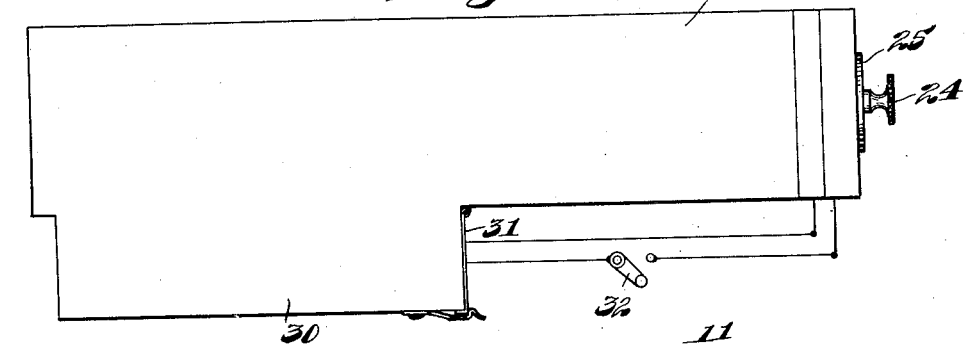
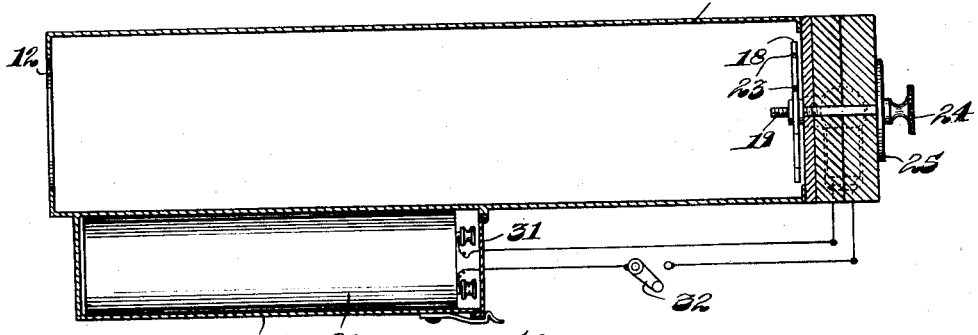
Witnesses:
C. E. Wessels.
A. A. Olson.
Inventor:
Carl Stang.
By Joshua R. H. Potts
his Attorney.

C. STANG.
PHOTOMETER.
APPLICATION FILED SEPT. 28, 1918.

1,329,439.

Patented Feb. 3, 1920.
2 SHEETS—SHEET 2.

Witnesses:
C. E. Wessels.
A. A. Olson.

Inventor:
Carl Stang,
By Joshua R. H. Potts
his Attorney.

UNITED STATES PATENT OFFICE.

CARL STANG, OF CHICAGO, ILLINOIS.

PHOTOMETER.

1,329,439.

Specification of Letters Patent.   Patented Feb. 3, 1920.

Application filed September 28, 1918.   Serial No. 256,137.

*To all whom it may concern:*

Be it known that I, CARL STANG, a citizen of the United States, and a resident of the city of Chicago, county of Cook, and State of Illinois, have invented certain new and useful Improvements in Photometers, of which the following is a specification.

My invention relates to photometers, that is, devices designed for use to aid in ascertaining the correct time of exposure necessary in the taking of pictures.

More material, and therefore money, is wasted by amateur photographers through error in the time of exposure in the taking of pictures than results from all other causes and errors committed by amateur photographers. It is the object of this invention to provide a device through the medium of which a photographer may readily and easily ascertain the proper time of exposure before taking a picture, thereby materially assisting in obtaining successful results and in the saving of money which otherwise is wasted through improperly exposed films. A further object is the production of a device as mentioned, which will be of durable and economical construction and highly efficient in use.

Other objects will appear hereinafter.

The invention consists in the combinations and arrangements of parts hereinafter described and claimed.

Figure 4:
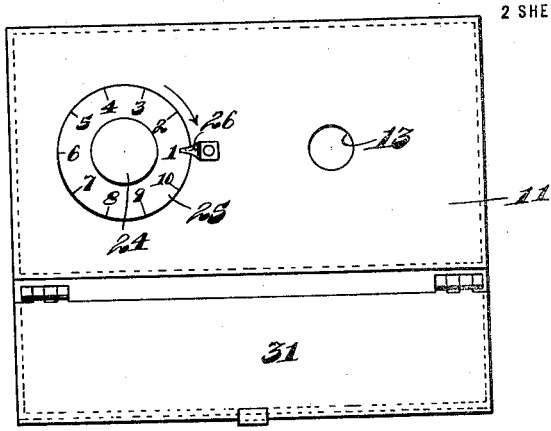
Figure 5:
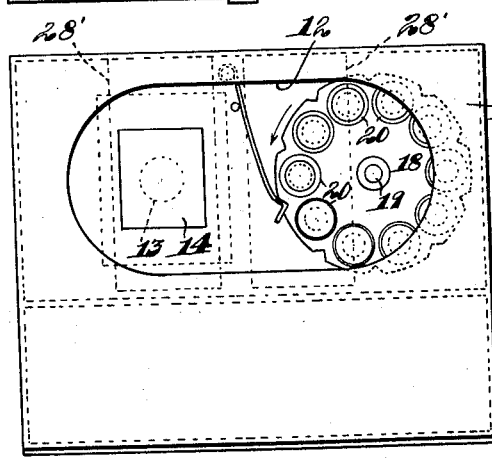
Figure 6:
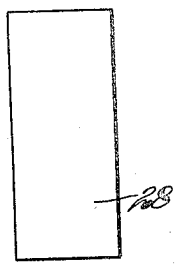
Figure 8:
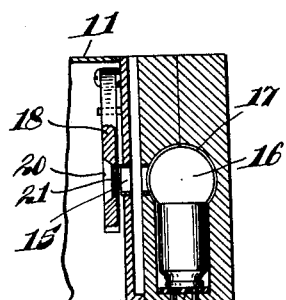
Figure 7:
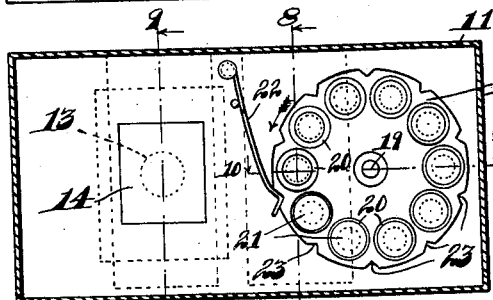
Figure 9:
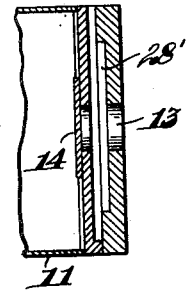
Figure 10:

The invention will be best understood by reference to the accompanying drawings forming a part of this specification, and in which;

Figure 1, is a partially sectional top plan view of a photo meter embodying the invention, Fig. 2, a side elevation thereof, Fig. 3, a longitudinal section through the device, Fig. 4, a front elevation of the device, Fig. 5, a rear elevation thereof, Fig. 6, a front elevation of one of the transparencies used in connection with the device, Fig. 7, a transverse section through the device looking toward the front end thereof, and Figs. 8, 9 and 10, sections taken on lines 8—8, 9—9 and 10—10, respectively, of Fig. 7.

The preferred form of construction, as illustrated in the drawings, comprises an elongated closed casing or housing 11, the rearward end of which is provided with a viewing opening 12.

Formed in the front end of casing 11 is an opening 13 for the admission of external light, a suitable transparency 14 of desired opaqueness being arranged over the inner side of said opening to effect proper diffusion of the light passing therethrough. Also formed in the front end of casing 11 is an opening 15 in front of which is arranged an electric light bulb 16 arranged in an inclosed chamber 17, the arrangement being such that the light 16, when in operation, will be viewable through the opening 15 from the viewing opening 12. Arranged within the casing 11 for coöperation with the opening 15 and the light 16 is a rotatably mounted disk 18 carried by an exteriorly projecting stem or shaft 19. The disk 18 is formed with a plurality of spaced openings 20 adapted, upon rotation of said disk, to be brought into successive registration with the opening 15, as will be readily understood. Arranged in each opening 20 is a transparency 21, the transparencies 21 of the various openings 20 being of varying degrees of opaqueness, the graduation in the degrees of opaqueness of said transparencies 21 being secured through the use of a plurality of layers of transparent material which comprise each transparency 21, as seen in Fig. 10, and by varying the number of such layers in the various openings 20. It is, of course, apparent that the fewer the layers employed in each transparency the less opaque the transparency will be, the opaqueness being increased through the employment of more layers. Thus, with this arrangement, through rotary adjustment of the disk 18 carrying the various transparencies 21 into registration with the opening 15, more or less of the light emanating from the lamp 16 may be cut off and thus the intensity of this light, as viewed from the viewing opening 12, varied as desired.

The disk 18 is yieldingly held in positions of rotary adjustment by means of a resilient pawl 22 which is adapted for engagement with notches 23 formed in the periphery of said disk. The outer end of the stem or shaft 19 of said disk is provided with a knurled head 24 for effecting manual rotation thereof. Carried by said stem is a graduated disk 25 having graduations corresponding with the transparency openings 20 of the disk 18, and coöperating with the graduations on disks 25 is an indicator or finger 26.

In using the device, the operator holds the same pointing in the direction of the object or scene to be photographed and looks through the viewing opening 12 toward the openings 13 and 15. When thus held, external light will pass through the opening 13 and artificial light will pass through the opening 15 emanating from the lamp 16. With the device thus held the operator, through engagement with the head 24 adjusts the disk 18 to such position that the light emanating from the lamp 16 will be of the same intensity or brilliancy as that passing through the opening 13. When this adjustment has been effected, the operator consults the dial 25 to ascertain which graduation is registering with the indicator 26. The graduation having been determined, he then refers to a scale or table 27 provided upon the outer side of casing 11, where is shown the duration of the film exposure time, as for instance one-fiftieth of a second, one-fourth of a second, and the size of the diaphragm opening as for instance 32, 16, 22, etc., the camera being correspondingly adjusted, as will be readily understood.

When the disk 18 is adjusted to allow for the maximum passage of light therethrough, the light permitted to be passed through the opening 13 should be exactly the same, on an ideal day, that is, one in which the actinic conditions are ideal. To secure this initial adjustment, supplemental transparencies 28 may be inserted into slots 28′ provided in the casing 11 at the openings 13 and 15, as clearly seen in Figs. 1, 9 and 10.

The lamp 16 is actuated through the medium of a dry cell 29, which is removably arranged in a chamber 30 provided at the under side of casing 11, said chamber having a suitable spring-held door 31. A suitably positioned control switch 32 is interposed in the circuit of said lamp. As the dry cell 29 loses its strength, the light emanating from the lamp 16 will, of course, become less brilliant, necessitating the employment of the supplemental transparencies 28, as above referred to.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

A photo meter comprising a casing having a viewing opening and an opening for the admission of external light; a source of light in said casing; means for varying the intensity of the light from said source for comparison with the light entering through said light admission opening, said means comprising a movably mounted holder; a plurality of transparencies of graduated opaqueness carried by said holder adapted to be brought successively into registration with said source of light; and supplemental adjustably mounted transparencies adapted for coöperation with said source of light and said light admission opening for varying the intensity of the light emanating therefrom as seen from said viewing opening, substantially as described.

In testimony whereof I have signed my name to this specification in the presence of two subscribing witnesses.

CARL STANG.

Witnesses:
ARTHUR A. OLSON,
JOSHUA R. H. POTTS.